No. 835,140. PATENTED NOV. 6, 1906.
O. H. OLSEN.
MACHINE FOR MOLDING BUILDING BLOCKS.
APPLICATION FILED MAY 19, 1905.

3 SHEETS—SHEET 1.

Witnesses
J. L. Moestake
May M. Plyer

Inventor
Ole H. Olsen
By Jas. L. Skidmore
His Attorney.

No. 835,140. PATENTED NOV. 6, 1906.
O. H. OLSEN.
MACHINE FOR MOLDING BUILDING BLOCKS.
APPLICATION FILED MAY 19, 1905.
3 SHEETS—SHEET 2.
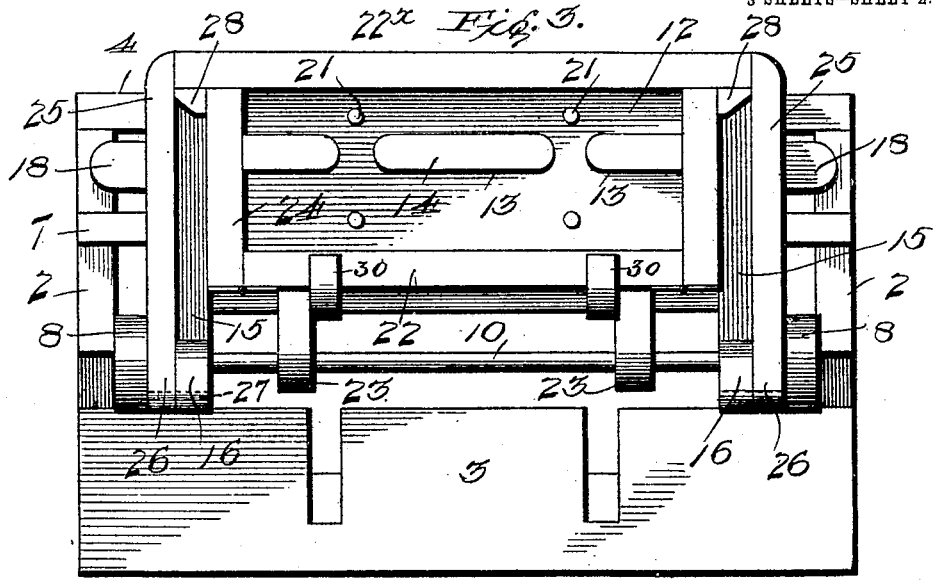
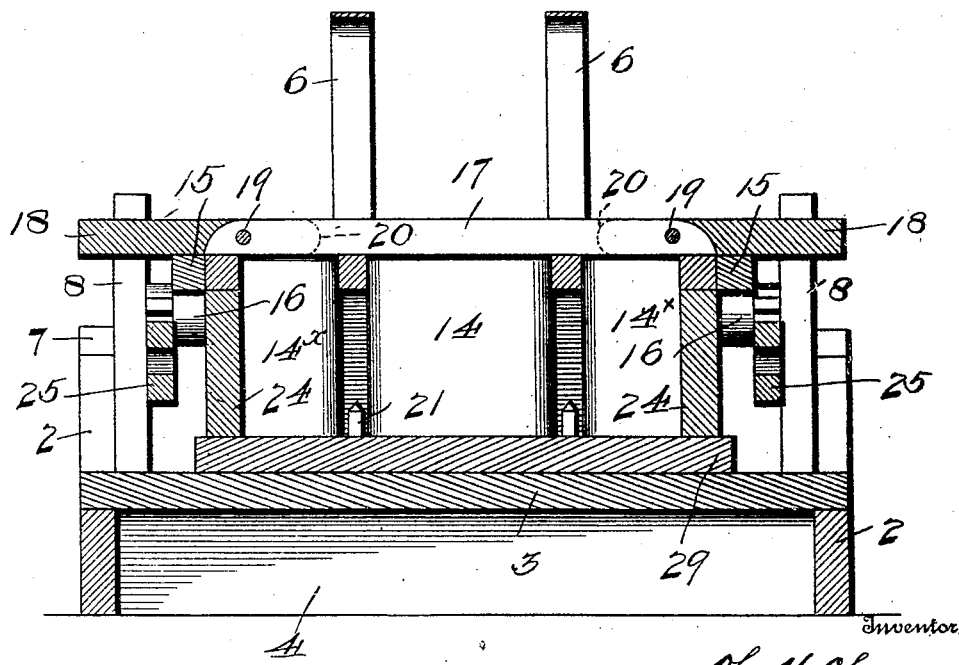
Witnesses
Inventor
Ole H. Olsen
By Jas. L. Skidmore
His Attorney.

No. 835,140. PATENTED NOV. 6, 1906.
O. H. OLSEN.
MACHINE FOR MOLDING BUILDING BLOCKS.
APPLICATION FILED MAY 19, 1905.
3 SHEETS—SHEET 3.
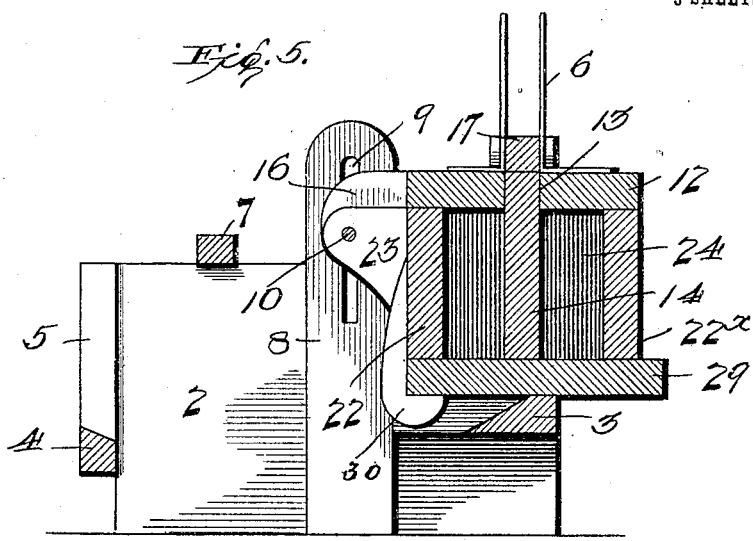
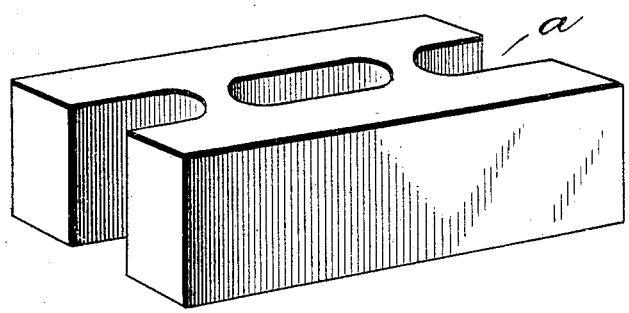
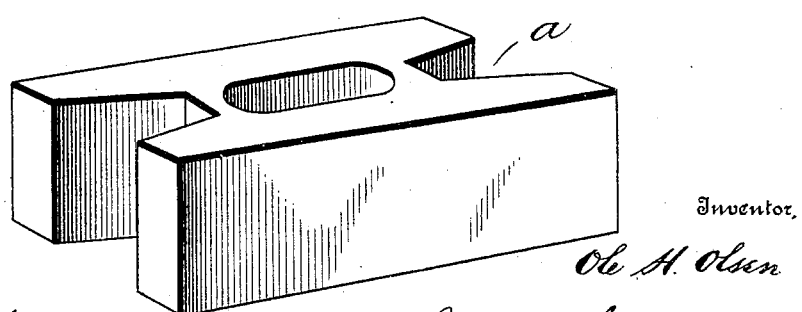

UNITED STATES PATENT OFFICE.

OLE H. OLSEN, OF ROCK RAPIDS, IOWA.

MACHINE FOR MOLDING BUILDING-BLOCKS.

No. 835,140.     Specification of Letters Patent.     Patented Nov. 6, 1906.

Application filed May 19, 1905. Serial No. 261,120.

*To all whom it may concern:*

Be it known that I, OLE H. OLSEN, a citizen of the United States, residing at Rock Rapids, in the county of Lyon and State of Iowa, have invented new and useful Improvements in Machines for Molding Building-Blocks, of which the following is a specification.

This invention relates to machines for molding building-blocks or artificial-stone blocks or bricks to be made from granular materials, such as sand and cement or granular rock, clay, cement, or other silicious or argillaceous substances properly mixed together to form a plastic compound which becomes hard and solid when dry; and one of the principal objects of the invention is to provide a machine in which hollow blocks or blocks provided with apertures or recesses may be quickly molded and readily removed from the mold-box.

Another object is to provide a machine of this character which will mold a block or brick having side recesses or grooved ends and a hollow center or a cross-bar connecting two members of the block and in which the core to form such recesses, grooves, or cross-bar may be quickly withdrawn from the molded block without distorting the contour of the freshly-molded block.

Still another object is to provide a machine of this character which will be simple in construction and which can be quickly and efficiently operated by unskilled workmen.

These and other objects are attained by means of the construction illustrated in the accompanying drawings, in which—

Figure 1:
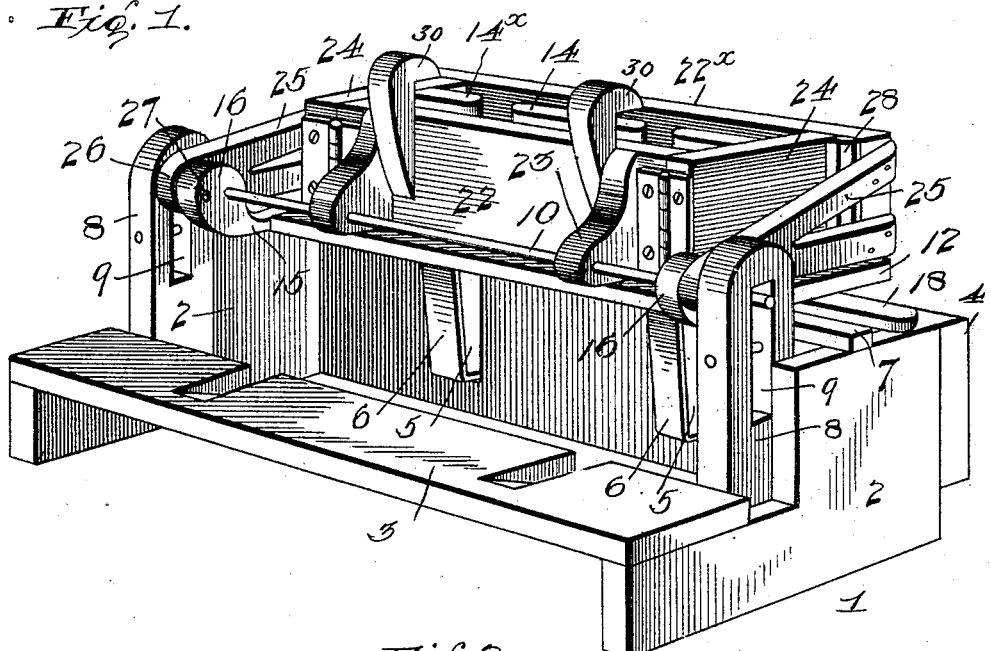
Figure 2:
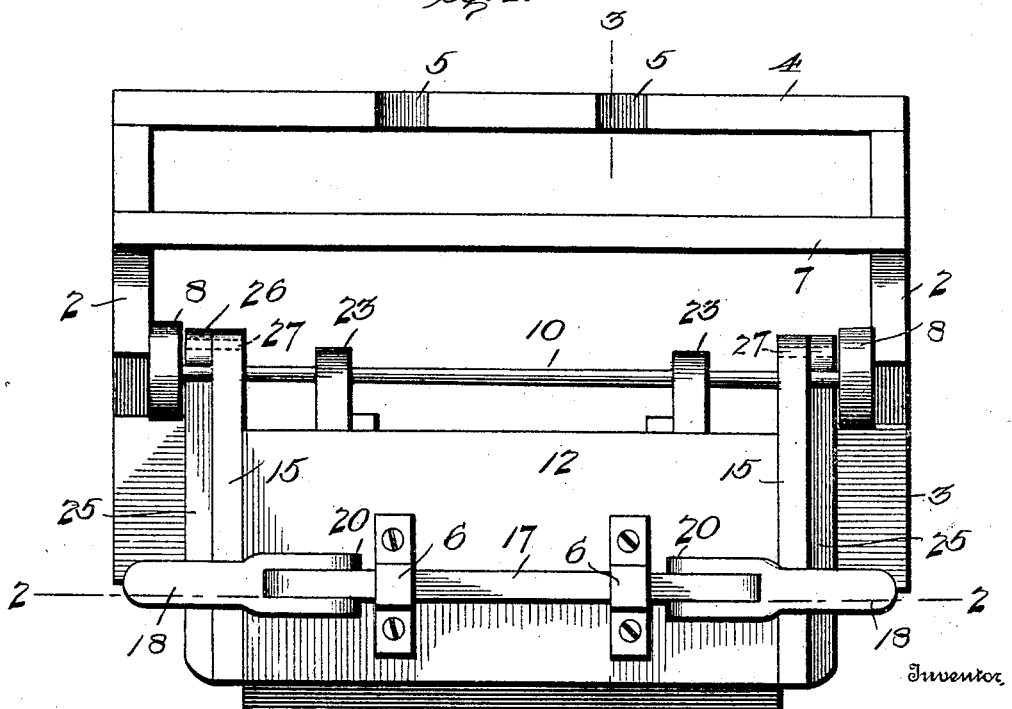

Figure 1 is a perspective view of a machine made in accordance with my invention, and the removable drying board or cover for the mold-box being removed. Fig. 2 is a plan view of the machine with the mold-box thrown down in position to remove the hinged core preparatory to removing the block or brick. Fig. 3 is a similar view showing the various members of the core and mold-box removed from the block or brick and the latter resting on the removable drying-board. Fig. 4 is a longitudinal section on the line 2 2, Fig. 2. Fig. 5 is a transverse section on the line 3 3, Fig. 2. Fig. 6 is a perspective view of one of the blocks or bricks formed on the machine. Fig. 7 is a similar view of another from of block which may be made on a machine made in accordance with my invention.

Referring to the drawings for a more particular description of my invention, the numeral 1 represents the table or support for the mold-box, said table comprising the end pieces 2, having a portion cut away to provide a step or support 3 in front and having a back piece 4, provided with slots or recesses 5 for the core-guides 6. A cross-bar 7 extends from one end piece 2 to the other and serves as a support for the mold-box when in its upper position. Upright bearings 8 are secured to the end pieces 2, said bearings being provided with slots 9 to accommodate a shaft or rod 10, to which the various parts of the mold-box are hinged. The core member consists of a top board 12, having openings 13 therein for the cores 14, and at the ends of said board 12 hinge-bars 15 are secured. Said hinge-bars are provided with enlarged ends 16, through which the rod 10 passes to pivotally support the core member. The cores 14 are secured to a bar 17, mounted to slide within the guides 6, and at the ends of the bar 17 cam-levers 18 are pivoted, said cam-levers each consisting of bifurcated arms pivoted at 19 to the bar 17, the ends of said arms being rounded, as at 20, to bear on the top board 12 to raise the cores 14 and withdraw them from molded blocks, as will presently appear. It will be obvious that the form of the cores may be varied to produce the required opening in the building-block. On the inner side of the top 12 a series of pins 21 are secured for the purpose of forming apertures in the block, if it is desired to use such, and, if not, the pins may be removed.

One of the sides 22 of the mold-box is provided with bearing-lugs 23, through both of which the rod 10 passes to form a hinge for the side 22, and the ends 24 are hinged to the ends of the side 22, so that they may be swung outward away from the ends of the block or brick when it has been formed and is ready for withdrawal from the box. The other side $22^\times$ of the box is connected to forked arms 25, the inner ends of which are enlarged, as at 26, and connected by pivot-pins 27 to the enlarged ends 16 of the hinge-bar 15. It is to be noted that the pivot-pins 27 are disposed eccentrically to the rod 10, and hence when the side $22^\times$ is swung, as will presently appear, the side $22^\times$ moves laterally away from the molded block. At the corners of the side piece $22^\times$ cleats 28 are secured, said cleats serving to hold the end pieces 24 in place when the mold-box is in position to receive the plastic material from which the block is to be formed. If it is desired to form end recesses $a$ in the blocks, core-pieces $14^\times$ may be hinged to the end pieces 24, as will be obvious.

When the mold-box is in its uppermost position resting upon the cross-bar 7 and the guides 6 lying within the slots or recesses 5 in the back piece 4, the material for forming the brick or block is placed in the box around the core-pieces. The drying-board 29 is then placed over the top of the mold-box and held in place by the overhanging hooks 30. When the block has been set properly, the mold-box and drying-board are swung on the rod 10 to a position resting upon the support or step 3, the rod 10 then moving down to be supported in the lower ends of the slots 9, and the drying-board then being at the bottom of the mold-box. The core-pieces 14 are then withdrawn by means of the levers 18, and the top 12 is swung back on the rod 10 to a position resting upon the cross-bar 7. This movement of the top 12 moves the side piece $22^\times$ outward away from the block or brick, owing to the fact that the pivot-pins 27 are disposed eccentrically to the rod 10. The side piece $22^\times$ may now be swung back away from the brick, the end pieces swung outward, and the side piece then carried up, or the drying-board slid outward to carry the brick or block to a place to be dried or set.

From the foregoing it will be obvious that any kind of hollow or recessed building blocks or bricks may be quickly formed by means of my invention and that all parts of the mold-box may be readily withdrawn from the sides and top of the block or brick, leaving the latter on the top of a drying-board.

Various changes in the form and proportions of the parts may be resorted to without departing from the spirit or scope of the invention.

Having thus described my invention, what I desire to secure by Letters Patent and claim is—

1. In a brick-machine, a mold-box comprising pivoted sides, hinged ends, a pivoted cover provided with slots, and core-pins supported by the cover, said core-pins having a sliding movement through the said cover.

2. In a machine for molding building-blocks, a mold-box having a pivoted top or cover provided with slots, core-pieces mounted to slide through said slots, and cam-levers carried by the core-pieces for withdrawing said core-pieces through the cover.

3. In a machine for molding building-blocks, a frame, a pivoted cover provided with slots, core-pieces carried by the cover and mounted to slide through the slots in said cover, cam-levers for withdrawing the core-pieces, side pieces separately hinged to the frame, and means whereby one of the sides is moved laterally when the top is swung back to remove the molded block.

4. In a machine of the character described, the combination of a supporting-frame, uprights connected to said frame, a rod supported in bearings within said uprights, a mold-box made in separable parts the top and sides being pivoted to said rod, and a drying-board for supporting the molding-block when the mold-box has been removed therefrom.

5. In a machine of the character described, a frame or support, the top and sides of the mold-box separately hinged to a rod supported in bearings, one of said sides being mounted eccentrically to the top and other side, and sliding core-pieces, substantially as described.

6. In a machine of the character described, a mold-box having an eccentrically-pivoted side piece adapted to be projected laterally from said mold-box, and a side piece having hinged ends, substantially as described.

7. In a machine of the character described, a mold-box having an eccentrically-mounted side piece adapted to be projected laterally from said mold-box, a side piece having hinged ends, sliding core-pieces, and cam-levers for withdrawing the core-pieces, substantially as described.

8. A mold-box for forming building-blocks comprising a slotted top, core-pieces supported by the top and fitted to slide through the slots in said top, sides and ends separably removable from the molded articles, hooks or keepers connected to one of the sides and a separate drying-board adapted to slide under said hooks or keepers, substantially as described.

OLE H. OLSEN.

In presence of—
  W. E. DUNKLEBARGER,
  THOMAS ABRAHAM.